M. W. ARNDT & A. W. SANFORD.
STOP SIGNAL FOR VEHICLES.
APPLICATION FILED OCT. 26, 1916.
1,251,322.
Patented Dec. 25, 1917.
2 SHEETS—SHEET 1.
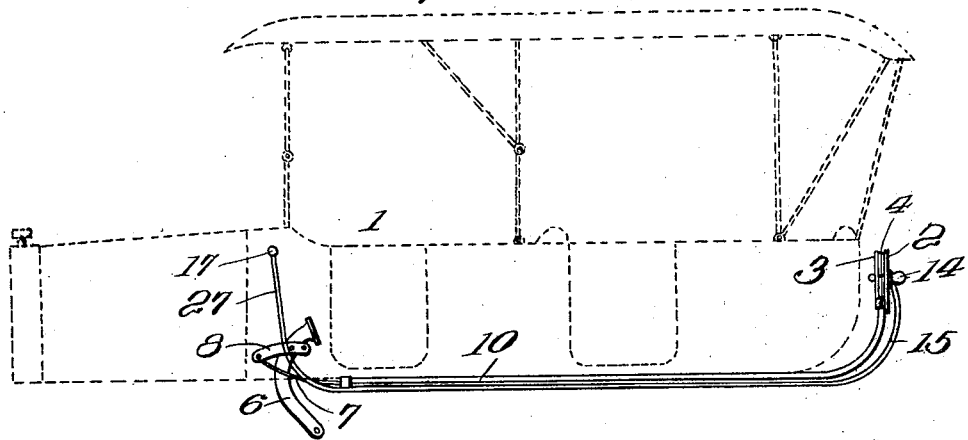
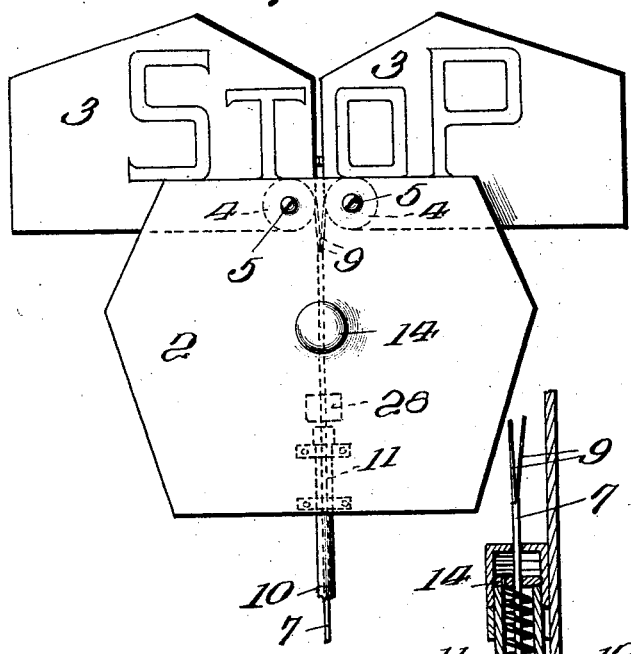
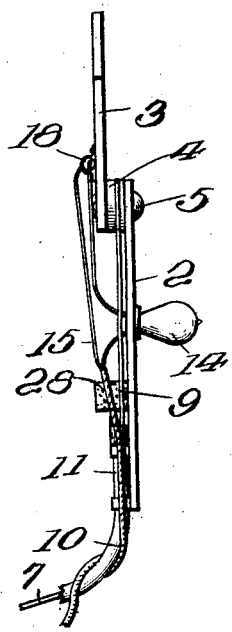
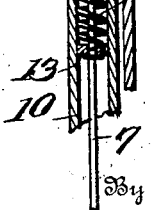

M. W. ARNDT & A. W. SANFORD.
STOP SIGNAL FOR VEHICLES.
APPLICATION FILED OCT. 26, 1916.
1,251,322.
Patented Dec. 25, 1917.
2 SHEETS—SHEET 2.
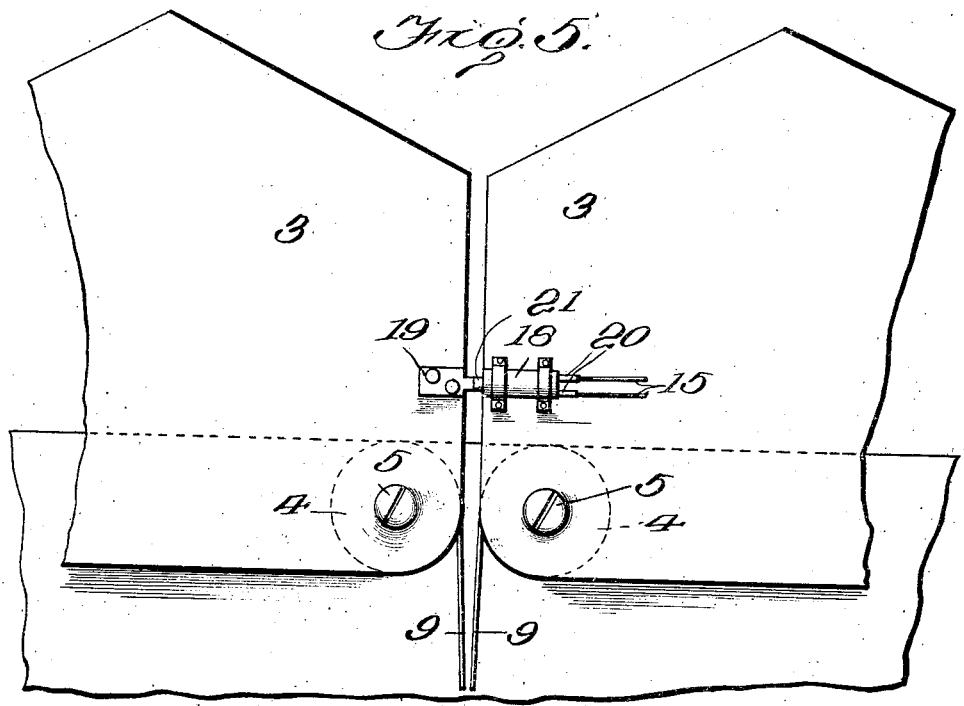
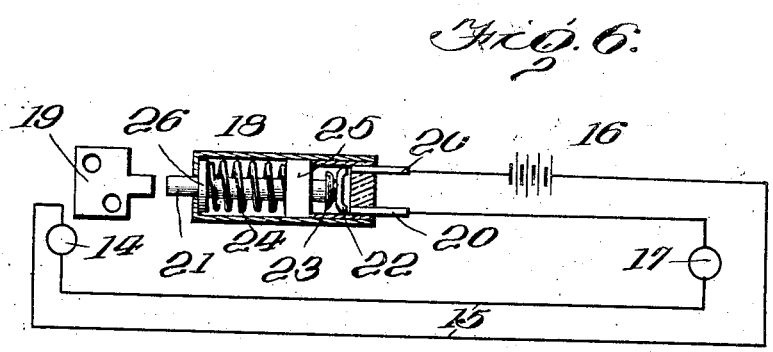

UNITED STATES PATENT OFFICE.

MAXIMILIAN W. ARNDT AND ARTHUR W. SANFORD, OF CLEVELAND, OHIO.

STOP-SIGNAL FOR VEHICLES.

1,251,322.	Specification of Letters Patent.	Patented Dec. 25, 1917.

Application filed October 26, 1916. Serial No. 127,884.

*To all whom it may concern:*

Be it known that we, MAXIMILIAN W. ARNDT and ARTHUR W. SANFORD, citizens of the United States, residing at Cleveland, in the county of Cuyahoga and State of Ohio, have invented certain new and useful Improvements in Stop-Signals for Vehicles, of which the following is a specification, reference being had therein to the accompanying drawing.

This invention relates to improvements in stop signals for vehicles, and is particularly intended for use on motor vehicles.

The object of the invention is to provide means for exposing at the rear of the vehicle a signal containing the word "Stop" or other suitable signal when the vehicle has stopped, or is about to stop.

A further object of the invention is to connect the signal with the clutch lever of a motor vehicle so that when the clutch lever is moved to release the clutch for stopping the vehicle, the signal will be exposed by the movement of the clutch lever.

A further object of my invention is to automatically cause a light adjacent the signal when it is exposed for use at night.

In the accompanying drawings—

Figure 1 shows an outline of a motor vehicle body with our invention applied thereto.

Fig. 2 is an enlarged rear elevation of the stop signal; its shield and light.

Fig. 3 is an edge view of Fig. 2.

Fig. 4 is an enlarged sectional view through the portion 4—4 of Fig. 2.

Fig. 5 is an enlarged view showing the inner edges of the signal plates carrying an electric contact.

Fig. 6 is a diagrammatic view partly in section of the electrical contact for the light adjacent the signal plates.

In Fig. 1 we illustrate an outline of a vehicle body 1, to which our stop signal is shown applied. In carrying out our invention a shield plate 2 is suitably supported at the back of the vehicle either in the center or at one side. Two signal plates 3 have their inner lower corners pivotally connected with the shield 2. The pivotal connections consists of two rolls 4 to which the inner lower corners of the plates 3 are attached, and these rolls are journaled on a suitable bearing 5. The word "Stop" is arranged on these plates, two letters of the word being on one plate and the other two on the other plate. These plates 3 are shown elevated in their signal position in Fig. 2. When, however, they are permitted to drop down, they will fall behind the shield 2. These plates 3 are operatively connected with a suitable lever for elevating them to the signal position, shown in Fig. 2. When applied to a motor vehicle, the clutch pedal or lever 6 is operatively connected with the signal plates 3 in the following manner: A rod, wire or chain 7 is suitably connected with the clutch lever 6, either directly or through the medium of a suitable clamp 8. The opposite end of the rod, wire or chain 7 is divided into two flexible members 9, one flexible connection being attached to and passes around one of the rolls 4, and the other flexible connection passes around the other roll 4. A pull on the rod, wire or chain 7, causes the rolls to rotate in a direction to elevate the signal plates 3 to the positions shown in Figs. 2 and 5. When the flexible members 9 are released the signal plates will drop behind the shield 2.

Preferably a wire or chain 7 is used, and preferably this passes through a tube 10, extending under the car-body and suitably attached thereto, the rear end 11 of the tube 10 being attached to the shield 2, and if desired, this tube 10 may form the support for the stop signal and its shield, as shown in Fig. 1.

Located in the rear end of the tube 10 is a contact spring 12 the lower end 13 of which is suitably connected with the member 7, and the upper end 14 is stationary and held in any suitable manner to the tube 11, and the contacting spring 12 serves to pull the member 7 upward and rearward in the tube 10.

In operation when the lever 6 is moved forward, it pulls the member 7 drawing down on the flexible members 9, which are connected with the rollers 4 causing them to turn and carry with them the signal plates 3, thus swinging the signal plates upward in the position shown in Fig. 2, exposing the signal and indicating to those behind that the vehicle is going to stop.

It will be understod, of course, that the invention could be applied to any type of vehicle other than a motor vehicle, and in which event, the lever 6 could be either a brake lever or simply an idle lever having only the function of operating the signal.

The spring 12, only serves to take up the slack on the member 7, and where the signal plates 3 are made sufficiently heavy, this spring may be omitted because the signal plates 3 will normally fall by gravity, and if the weight is sufficient, this gravity will serve to pull the member 7 without the intervention of the spring 12.

For the purpose of making the signal visible at night, we provide a light 14, at the rear side of the shield 2, and this light is in an electrical circuit 15, suitably connected with any source of electricity 16, whether battery or an electrical generator. Also in this circuit and located at the dash is a light 17, so that the operator may know when the light 14 is operated.

The means for causing the closing of the electrical circuit 15 when the plates 3 are elevated, consists in having one of these plates provided with the casing 18, and the other plate 3 with a contact 19. The two wires 15 of the electrical circuit pass into one end of the casing 18, as shown at 20, and will be suitably insulated from the casing. Located in the casing is a movable contact member 21, carrying at one end a circuit closer 22, which is insulated from the movable member 21, by suitable insulation 23. A spring 24 has one end engaging a stop partition 25, in the casing and the other end engaging a flange or pin 26, carried by the movable member 21. Normally the spring 24 holds the member 21 in the position shown in Fig. 6, and the circuit closer 22 open. When, however, the signal plates 3 are elevated to the position shown in Fig. 2, the members 19 and 21 are caused to engage, which will push the member 21 endwise in the case and cause the circuit closure 22 to engage the ends 20 of the circuit wires 15, thus closing the circuit and causing the lights 14 and 17 to be lighted. A suitable switch 27 will be placed at any point in the circuit so that the circuit can be broken in the daytime, preventing the use of current and of lamps.

Having thus described our invention, what we claim and desire to secure by Letters Patent is:

1. A signal comprising a supporting and shield plate, signal members pivoted at their inner upper ends to the shield plate and normally held down behind said plate, and means for moving the said signal members upwardly in a horizontal position with their ends abutting.

2. A signal comprising a shield plate, two plates pivoted thereto and normally behind the shield plate, means for swinging the said plates from behind the shield plate and arranging them for displaying a signal, an electric lamp adjacent the signal plates, an electric circuit including the said lamp and a make and break electric contact carried by the signal plates and also within the said circuit, whereby when the signal plates are swung from behind the shield plate the lamp is lighted.

3. A signal comprising a supporting and shield plate, signal members pivoted at their inner and upper ends to the shield plate and normally held down beyond said plate and swinging upwardly in opposite directions, and means for swinging the signal members upwardly from behind the plate in an abutting position.

4. A signal comprising a shield plate, two signal plates pivoted to the upper edge of the shield plate and normally down behind the plate and capable of swinging up in opposite directions from behind the plate, means for swinging the signal plates from behind the shield plate, electric connections with the plates adjacent their pivotal points and with swinging means whereby when the swinging means is operated, the signal plates are swung from behind the shield plate to constitute a signal.

5. A signal comprising a shield plate, two signal plates pivoted thereto and normally behind the shield plate but capable of swinging to exposed position, an electric lamp carried by the shield plate, an electric circuit including the said lamp, a circuit closer within the circuit and carried by one of the signal plates, the said circuit closed by the signal plates when swung to exposed position, and means for swinging the signal plates from behind the shield plate.

6. A signal comprising a shield plate, two signal plates movably attached thereto and normally behind the shield plate but capable of being moved to exposed position, an electric lamp adjacent the shield plate, an electric circuit including the said lamp, a plunger actuated circuit closure within the circuit and carried by one of the signal plates, an abutment carried by the other signal plate for engaging the said plunger when the signal plates are exposed for displaying a signal, the engagement of the abutment and plunger closing the circuit and lighting the lamp, and means for moving the signal plates from behind the shield plate.

7. A signal comprising a shield plate, two signal plates pivoted at their adjacent lower corners to the upper edge of the shield plate on each side of the center thereof, the said signal plates normally swinging down behind the shield plate, and means for raising the signal plates and exposing them for displaying a signal.

8. A signal comprising a shield plate, two plates each bearing a portion of a signal word thereon, the said plates normally behind the shield plate, and means for exposing and alining the said plates so that the fragments of the signal word carried thereon will be assembled and a signal displayed.

9. A signal comprising a supporting and shield plate, signal members pivoted at their inner upper ends to the shield plate and normally held down behind said plate, means for moving said signal members upwardly in abutting position, an electric circuit including a lamp carried by the plate, and make and break members carried by the abutting edges of the signal member, whereby when the signal members are swung from behind the shield plate in abutting position the lamp is lighted.

10. A signal comprising a shield plate, two plates each bearing a portion of a signal word thereon, the said plates normally held behind the shield plate, means for exposing and alining the said plates so that the fragments of the signal word carried thereon will be assembled and a signal displayed, an electric circuit including a lamp carried by the plate, and a make and break member carried by the abutting edges of the signal members, whereby when the signal members are alined in abutting position the lamp is lighted.

In testimony whereof we hereunto affix our signatures in the presence of two witnesses.

MAXIMILIAN W. ARNDT.
ARTHUR W. SANFORD.

Witnesses:
MARIE ARNDT,
HELEN M. SANFORD.